(12) United States Patent
Schmidt

(10) Patent No.: US 6,945,371 B2
(45) Date of Patent: Sep. 20, 2005

(54) WET CLUTCH OR FRICTION PLATE BRAKE

(75) Inventor: Thomas Schmidt, Landau (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/615,410

(22) Filed: Jul. 8, 2003

(65) Prior Publication Data

US 2004/0074708 A1 Apr. 22, 2004

(30) Foreign Application Priority Data

Jul. 18, 2002 (EP) .............................. 02015962

(51) Int. Cl.[7] .......................... F16D 55/02; F16D 13/72
(52) U.S. Cl. ................ 188/71.6; 188/264 E; 192/70.12
(58) Field of Search .................... 188/71.5, 71.6, 188/264 E; 192/70.12, 85 AA, 106 F, 113.35

(56) References Cited

U.S. PATENT DOCUMENTS

| | | |
|---|---|---|
| 4,732,253 A | 3/1988 | Hiramatsu et al. |
| 5,281,190 A * | 1/1994 | Koivunen .................. 475/116 |
| 5,439,088 A | 8/1995 | Michioka et al. |
| 5,887,690 A | 3/1999 | Haupt |
| 2004/0154894 A1 * | 8/2004 | Braford et al. .......... 192/70.12 |

OTHER PUBLICATIONS

European Search Report; Jan. 2, 2003 # 020159620.

* cited by examiner

*Primary Examiner*—Chris Schwartz
(74) *Attorney, Agent, or Firm*—Emch, Schaffer, Schaub & Porcello, Co., L.P.A.; Greg Dziegielewski

(57) ABSTRACT

Wet clutch (100) or friction plate brake has an essentially hollow cylindrical shaped balance piston (14) that is coaxial to a clutch hub (2) and is rigidly connected with an apply piston support device (12), an essentially ring shaped spring support (14.1), and an essentially cylinder shaped wall (14.3) that has an essentially cylinder shaped contact surface (14.4). The cylinder shaped contact surface (14.4) is axially (ax) displaceable and is bordered by an essentially cylinder shaped contact surface (8.5) of an apply piston (8) so as to form an equalizing space (16). The contact or support surfaces (14.4, 8.5) of the balance piston (14) and the apply piston (8) are provided coaxial between the clutch hub (2) and the apply piston support device (12).

8 Claims, 8 Drawing Sheets

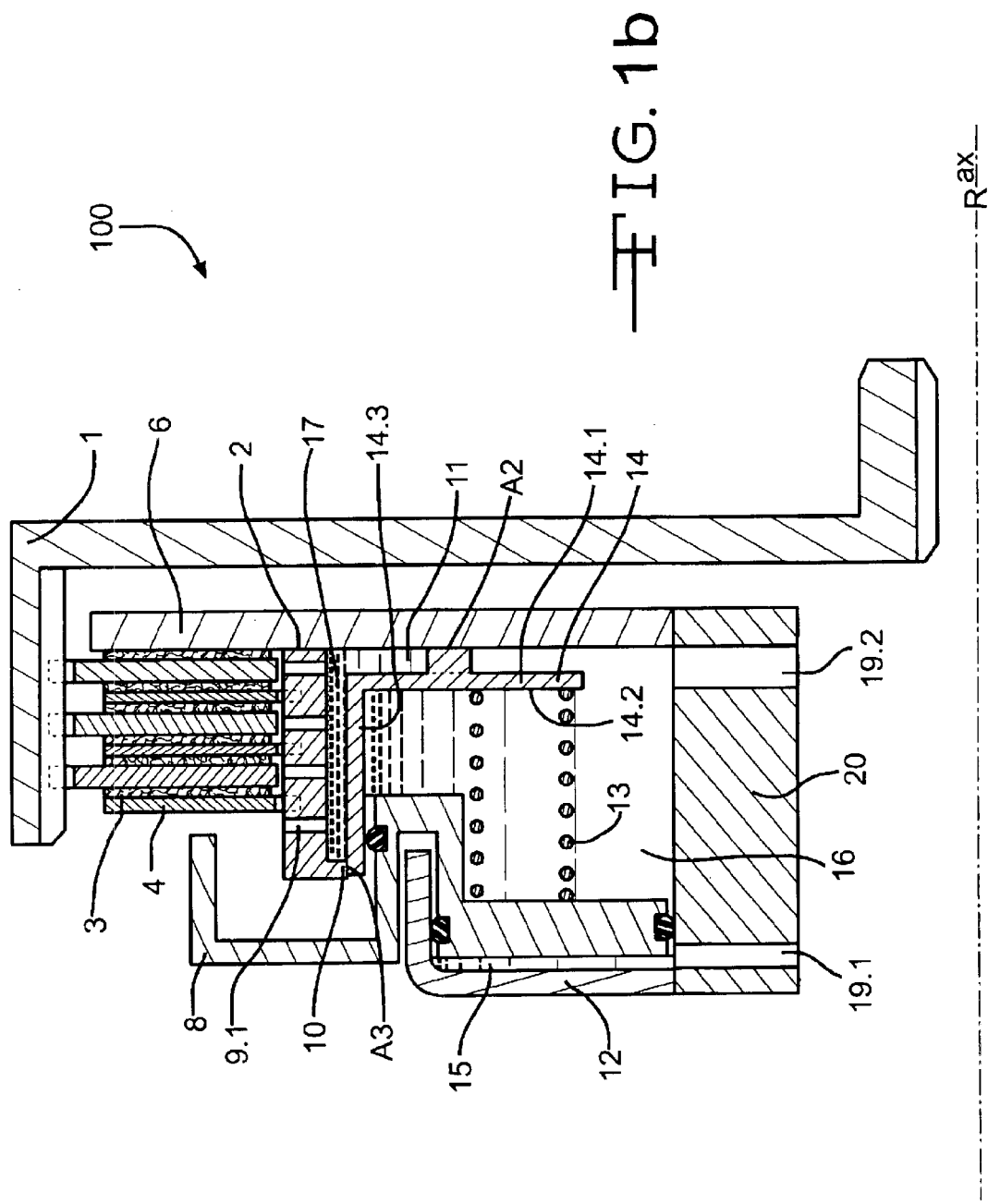

WET CLUTCH OR FRICTION PLATE BRAKE

BACKGROUND OF THE INVENTION

The invention concerns a wet clutch or a friction plate brake according to the pre-characterizing portion of Claim 1.

In this field a generic wet clutch or friction plate brake is generally comprised of a clutch housing, a clutch hub, various outer and inner friction plates, an apply piston and an apply piston support device for carrying the apply piston. All the above-mentioned construction components are as a rule formed essentially rotation-symmetrically and are provided coaxially about a common (rotation) axis.

The clutch housing is essentially in the form of a hollow cylinder and is mounted rotatably about the rotation axis. It carries one or more outer friction plates, wherein these are essentially displaceable or slideable in the axial direction.

In similar manner the clutch hub is also essentially in the form of a hollow cylinder and is mounted rotatably about the same rotation axis. This also carries one or more preferably ring-shaped inner friction plates which are displaceable essentially in the axial direction.

Outer friction plates and inner friction plates alternate in the axial direction, thereby forming so-called friction pack. Thereby one of the contact surfaces of an outer friction plate is arranged for contacting one of the contact surfaces of one inner friction plate, so that these can be brought into frictional contact by pressing against each other. The outer or the inner friction plates carry a friction lining.

The friction pack is closed off on one end in the axial direction by an apply plate, which could represent either one of the friction plates carried on the clutch housing or one of the friction plates carried on the clutch hub. In the axial direction on the other side of the friction pack there is an end plate which is basically not slideable in the axial direction. This end plate represents one of the friction plates carried on the clutch housing or one of the friction plates carried on the clutch hub.

In order to bring the broad faces of adjacent outer and inner friction plates into frictional contact with each other in the above-described manner, there is provided in accordance with the state of the art a so-called apply piston. An apply piston of this type is formed in the manner of a hollow cylinder or pot. The outer rim of the sidewall of the pot forms a ring-shaped pressure unit, which can be pressed against the free broad surface of the above-described apply plate. In this engaged or pressed-in condition, torque can be transmitted from the clutch housing onto the clutch hub, or the reverse.

In order to be able to operate this actuation piston it is necessary on the one hand that this is mounted in suitable manner to be axially slideable, and on the other hand that it can transmit a pressure force.

According to the state of the art, for transmission of the pressure force an apply piston support device is provided which is rigidly connected with the clutch hub or clutch housing by means of a suitable connecting device. This actuation piston support device is essentially in the form of a hollow cylinder and is provided coaxially and preferably radially interiorly to the clutch hub. The apply piston support device includes an essentially ring shaped piston support plate or plate, against which or upon which on one side, which in the following will be referred to as the piston support plate inner surface, the apply piston is supported for axially transmitting pressure force.

In this device, a ring-shaped hollow space is enclosed by the piston support plate inner surface, against which the apply piston supports itself, in combination with the cylindrically shaped support surface of the apply piston support device, plus the piston support outer surface of the apply piston by means of which the apply piston is supported on the piston support plate inner surface. In this hollow space, which in the following will be referred to as the apply piston space, there is situated oil, as in the entire inner space of the wet clutch.

If the clutch device is then set into rotational movement (so-called rotating clutch actuation), with increasing speed of rotation, oil tends to flow in this apply piston space due to centrifugal force and at the same time there is an associated increase in pressure. This pressure increase causes the apply piston to press in the axial direction against the friction pack. It is then necessary to employ suitable means to compensate for this parasitic force induced by centrifugal force.

According to the state of the art basically two possibilities are known for compensating for centrifugal force. On the one hand centrifugal force is compensated by a "check ball".

This means need not be discussed in greater detail in the following. It is further known in accordance with the state of the art to employ a so-called balance or balance piston. A balance piston of this type is based upon the idea of providing, in the apply piston space lying opposite the side of the apply piston, a space filled with oil in which a counter pressure is produced due to centrifugal force. In practical terms this is realized in accordance with the state of the art in the below described mode and manner.

One such balance piston according to the state of the art is essentially in the shape of a hollow cylinder, including a ring shaped floor and a cylindrical wall. This balance piston is provided coaxially to the clutch hub and is essentially fixed in axial direction with the apply piston support device. According to the state of the art the outer wall of the cylinder is provided coaxial and radially interior to the apply piston support device, while the walls of the hollow cylindrically shaped apply piston support device as well as those of the balance piston at their base or floor surfaces are oriented opposing each other in the axial direction.

The apply piston exhibits in the coaxial arrangement a ring shaped wall, of which the outer surface is guided slideably essentially in the axial direction on the inner surface of the cylindrical wall of the apply piston support device and of which the inner surface is guided slideably essentially in the axial direction on the outer surface of the essentially cylindrically shaped wall of the balance piston. By this particular arrangement of balance piston and apply piston to each other a hollow shape is formed, which represents the above discussed equalizing space.

Although an arrangement of this type has essentially proven itself as useful, with this type of arrangement a complete compensation of centrifugal forces is only possible at great expense. Usually, return spring devices are used. Further, attempts have been made to conform the axial lengths and stroke paths of apply piston support devices, apply pistons comprised of one or more parts, and balance pistons. Through the use of further supplemental construction components, finally a complete compensation is achieved. The realization of complete compensation however requires a substantial construction investment.

It has been found, that an optimization of this type is not possible in a compact construction. Until now a compensation of approximately 80% has been achieved herein.

BRIEF SUMMARY OF THE INVENTION

The invention is thus concerned with the task of designing and further developing a wet clutch system transmission according to the state of the art or a double clutch transmission, such that the above-described problems no longer occur. In particular, a complete compensation for centrifugal force is to be made possible with compact construction.

This task is inventively solved by a wet clutch system having the features of the characterizing portion of Claim 1.

Advantageous embodiments and further developments of the invention are set forth in the dependent claims.

The essential concept of the invention is comprised therein, that the contacting surfaces of the balance piston and the apply piston are no longer provided as in the state of the art coaxial and with radial separation within the apply piston support device, but rather that the corresponding contact surfaces for the balance piston and apply piston are provided coaxial between the corresponding cylinder shaped walls of the clutch hub and the apply piston support device. By this means it is achieved that the oil-wetted surfaces of the apply piston enclosed by the balance piston are significantly enlargened.

It has been found that a device of this type brings with it a further advantage. Details will be discussed in the following:

By the engaging arrangement of the clutch hub, the balance piston and the apply piston which is supported on the apply piston support device a space is enclosed thereby, which in the following will be referred to as the oil-space. In this oil space there is provided a certain amount of oil.

In an automatic transmission with a wet clutch it is necessary, in order to remove produced frictional energy, to direct a part of this oil situated in the oil space to the friction pack in the form of an oil flow. Since the oil situated in the oil space is, in any case, caused by centrifugal force to be flung against the inner wall of the clutch hub, this arrangement requires only appropriate oil supply channels or the like, which are provided in the inner wall of the clutch hub, to be guided to the individual friction plates.

If the balance piston is designed and positioned in accordance with the invention, then the volume of the oil space in the area of the inner wall of the clutch hub is reduced. Thereby a supplemental positive or forced oil flow occurs, which further supports the oil transport to the friction plates of the friction pack.

For increasing the stiffness and therewith providing an improvement of the hydraulic-mechanical ability of the total system to react it is optionally provided that the balance piston exhibits at least one contact point or position, at which this is connected to the clutch hub. It is inventively envisioned that at least one contact point is provided between the balance piston and the clutch hub at the floor plate of the balance piston. Alternatively or supplementally a contact point is provided on the outer surface of the cylinder wall of the balance piston.

As has already been described above in detail, it is necessary in automatic transmissions with wet clutches for removal of produced frictional energy, to direct a targeted oil stream to the friction pack. From the state of the art it is known to provide on the side of the clutch hub facing the apply piston a radially inwardly facing oil collecting ring. An oil collecting ring of this type is disclosed for example in the text book "Automatic Vehicle Transmissions" from Hans Joachim Foerster, 1990, ISBN 3-540-52228-X on page 285, FIG. A or page 286 FIG. A, element E. A fluid ring of oil is produced by this oil collecting ring on the inner side of the clutch hub, which is supplied by oil flung out of the oil space. Thereby oil is comparatively efficiently channeled through the above described oil channels or the like in the clutch hub to the friction plates of the friction pack. A greater oil volume is channeled bypassing the clutch as overflow.

It has further been found to be of advantage, when at least one of the above mentioned contact points between the balance piston and the clutch hub is situated at the inward facing oil collecting ring. In this manner a positive or forced guidance is formed immediately directly on the above-mentioned oil supply channels or the like in the clutch hub. An escape or evasion of a larger oil volume is no longer possible.

For guaranteeing a sufficient oil transport there is provided in accordance with the invention, in the case that the above discussed connecting devices are formed in the manner of a hollow cylinder, a common oil supply in the hollow cylinder for the equalizing space and the oil space. It is however possible in accordance with the invention that separate oil supplies are provided for the equalizing space and the oil space.

An illustrative embodiment of the invention is shown in the figure and will be described in greater detail in the following.

BRIEF DESCRIPTION OF THE SEVERAL VIEWS OF THE DRAWINGS

There is shown.

DETAILED DESCRIPTION OF THE INVENTION

The subject matter of the invention will be described below on the basis of a side-by-side comparison of a wet clutch of an automatic transmission according to the state of the art as shown in FIG. 2 and a wet clutch of an automatic transmission according to the invention as represented in FIG. 1. It should however be noted that the invention is concerned in general with force transmission aggregates of the type which employ for force transmission a friction pack with multiple friction plates (at least two friction plates), which intermesh or interdigitate in manner of gear teeth, wherein respectively adjacent friction plates can be brought into frictional contact with each other by means of a suitable actuating device.

Figure 2A:
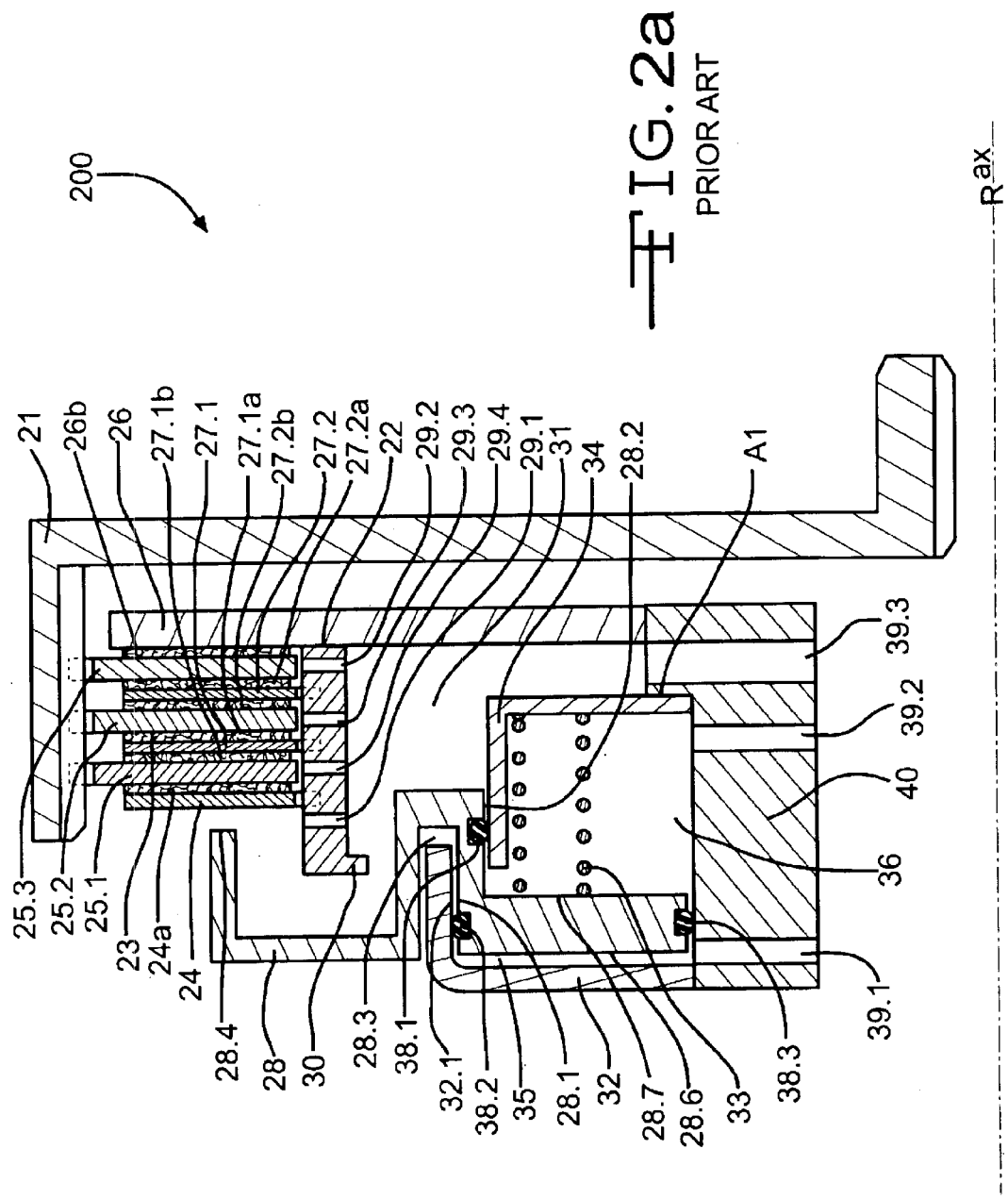

As can be seen from illustration FIG. 2a, a wet clutch 200 of an automatic transmission is comprised of a clutch housing 21 mounted rotatably about a rotation axis R, essentially in the shape of a hollow cylinder, as well as a clutch hub 22 provided at least partially coaxially to the clutch housing 21, mounted rotatably about the rotation axis R and likewise essentially in the shape of a hollow cylinder, and an apply piston support device 32 essentially in the shape of a hollow cylinder provided radially inwardly and coaxial to the clutch hub 22, and further, an apply piston 28, an balance piston 34 as well as an essentially hollow cylinder shaped connecting device 40 which rigidly connects the clutch hub 22, the balance piston 34 and the apply piston support device 32 to each other.

Outer and clutch hubs 21, 22 enclose a so-called friction pack 23, of which the individual components and the manner of operation will be described in greater detail in the following. The friction pack 23 illustrated in FIG. 2a is essentially comprised of four components, namely a so-called apply plate 24, a generally large number of steel core plates 25.1, 25.2 and 25.3 and friction plates 27.1 and 27.2 as well as a so-called end plate 26. All components—apply plate 24, steel core friction plates 25.1, 25.2, 25.3, friction plates 27.1, 27.2 and end plate 26—are provided essentially rotation symmetrically. They have preferably planar and preferably ring shaped contact surfaces. The surface area of the contact surfaces is as a rule large in comparison to the thickness of the friction plates 25.1, 25.2, 25.3, 27.1, 27.2.

It can further be seen from FIG. 2.1, representing the state of the art, that the apply plate 24 as well as the end plate 26 and the friction plates 27.1, 27.2, are provided with friction linings 24a, 26b, 27.1a, 27.1b, 27.2a and 27.2b. While the apply plate 24 and the end plate 26 respectively exhibit only one friction lining 24a and 26b, the friction plates 27.1 and 27.2 in this illustrative embodiment are provided on both sides with friction linings 27.1a, 27.1b as well as 27.2a and 27.2b.

It is readily apparent that other arrangements can be provided such as outer friction plates and inner steel friction plates or so-called single-side friction plate arrangements, which include alternating inner and outer friction plates provided on one side with a friction lining.

The individual friction plates 25.1, 25.2, 25.3, 27.1 and 27.2 as well as the apply plate 24 and the end plate 26 are provided in such a manner, that the respective friction linings 24a, 26b, 27.1a, 27.1b, 27.2a and 27.2b of contact surfaces of apply plate 24, end plate 26 and the friction plates 27.1 and 27.2 are provided adjacent to the respective friction-lining-free contact surfaces of the steel core friction plates 25.1, 25.2 and 25.3. In concrete terms this means an arrangement in axial direction in the following sequence: apply plate 24, steel plate 25.1, friction plate 27.1, steel plate 25.2, friction plate 27.2, steel plate 25.3 and end plate 26.

The apply plate 24, the end plate 26 as well as the friction plates 27.1 and 27.2 are connected in the radial direction essentially fixed against rotation with the so-called clutch hub 22. In analogous manner there results in radial direction an operative connection or association between the clutch housing 21 and the steel plates 25.1, 25.2 and 25.3. For achieving a connection of this type between the carriers 21 and 22 and the friction plates 25.1, 25.2, 25.3 and 27.1 and 27.2, 24, 26, these exhibit a corresponding (here not shown) spline. In particular the apply plate 24 and the friction plates 27.1 and 27.2 exhibit inner teeth, which engage in a corresponding outer spline of the clutch hub 22, and steel friction plates 25.1, 25.2 and 25.3 exhibit outer spline, which engage in a corresponding inner spline of the clutch housing 21. The end plate 26 in this illustrative embodiment is formed material unitarily as one piece with the clutch hub 22. It is however also conceivable that the end plate 26 exhibits a corresponding inner spline, which engages in the outer spline of the clutch hub 21.

If then the individual components, namely apply plate 24, steel plates 25.1, 25.2, 25.3, friction plates 27.1, 27.1 and end plate 26 are pressed hard against each other with an appropriate press force, then they are in condition to transmit, by the rubbing of the respective corresponding contact surfaces against each other, a torque introduced by the clutch housing 21 onto the clutch hub 22 or as the case may be a torque introduced by the clutch hub 22 onto the clutch housing 21. In concrete terms this is realized thereby, that with the aid of the apply piston 28 a pressure device 28.4, which in the FIG. 2a is shown in the withdrawn position, is pressed against the free contact surface of the apply plate 24, so that this together with the remaining friction plates 25.1, 25.2, 25.3, 27.1 and 27.2 of the friction pack 23 are rigidly pressed in axial direction against the end plate 26 which is connected essentially rigidly with the clutch hub 22.

The apply piston 28 in this illustrative embodiment is formed essentially ring shaped. On the outer circumference there is a projection in the shape of a cylinder outer surface, which forms the above-described apply ring 28.4.

This apply piston 28 is, as has already been discussed above, supported axially slideably on an apply piston support device 32 and adapted for transmitting the pressure force onto the apply plate 24. This apply piston support device 32 is likewise, with reference to the rotation axis R, formed essentially rotation symmetrical and is provided coaxial to the above-described components of the wet clutch 200. It is comprised essentially of a ring shaped base plate 32.2 and a wall 32.1 in the shape of a hollow cylinder which connects form-fittingly to the outer circumference thereof. The apply piston support device 32 has therewith essentially the shape of a pot, which in the center of its floor (indicated by reference number 32.3) exhibits an essentially circular shaped opening.

The apply piston 28 supports itself with a circular ring shaped floor surface 28.6 against the likewise circular ring shaped base or floor plate 32.2 of the apply piston support device 32. The supported floor surface 28.6 of the apply piston 28 will hereafter be referred to as the outer floor surface 28.6, the floor plate 32.2 of the apply piston support device 32 will hereafter be referred to as the piston support plate inner surface 32.2.

The pot-shaped structure of the apply piston support device 32 is, as can be seen from FIG. 2a, provided oriented with it's open side directed in the direction of outer and clutch hubs 21, 22. The cylinder shaped wall 32.1 of this pot shaped apply piston support device 32 is introduced in a recess or groove 28.3 which is circular-ring shaped, formed into the apply piston 28, and coaxial to the rotation axis R. The cylinder shaped edge surface of the apply piston support device forms in this manner a cylindrical contact surface 32.4, against which the likewise essentially cylindrical contact surface 28.1 of the recess 28.3 of the apply piston 28 lies. Further, a cylindrical shaped outer surface 40.1 of the cylindrically shaped connecting device 40 forms a further support or contact surface 40.1 for the inner circumference surface 28.8 of the ring shaped apply piston 28, so that the latter 28 is slideable in the axial direction against the contact surfaces 40.1, 32.4 of the connecting device 40 and the apply piston support device 32. For explanation purposes it is mentioned, that the corresponding contact surfaces 40.1 and 28.8 or, as the case may be, 28.1 and 32.4, do not lie immediately adjacent each other, but rather guide and sealing elements 38.2 and 38.3 are provided, which make possible a low friction movement and, beyond this, assume a sealing function.

It can further be seen from FIG. 2*a* how, in accordance with the state of the art, a balance piston 34 of the above-described type is constructed and arranged. The geometric shape of a balance piston 34 of this type corresponds basically to that of the above-described apply piston support device 32. In particular the outer circumference an essentially circular ring shaped base plate 34.1 is attached to a cylindrically shaped wall 34.2. The balance piston 34 therewith likewise has essentially the shape of a pot with a circular opening provided centrally in the floor.

The balance piston 34 is positioned, with reference to the apply piston 28, in such a manner that one of the inner floor surfaces 28.7 of the floor of the apply piston 28, which lies opposite to the outer floor surface 28.6, plus balance piston 34 and the outer surface 40.1 of the connecting device 40 together encloses a space which will hereafter be referred to as the equalizing space 36.

The outer surface 34.3 of the hollow cylinder wall 34.2 of the apply piston 34 and an inwardly facing cylindrical contact surface 28.2 formed by the recess of the circular ring shaped recess 28.3 formed in radial direction R are provided adjacent to each other. Between these contact surfaces 28.2 and 34.3 there is in the above-described mode and manner provided a guide element/sealing element 38.1, so that the apply piston is guided slideably supported by the balance piston 34 for sliding in the axial direction ax.

In the illustrative embodiment according to FIG. 2*a* there are thus essentially formed overall by the apply piston support device 32, the apply piston 28, the connecting device 40, the balance piston 34 as well as the clutch hub 22 three spaces or spaces separated from each other, namely the apply piston space indicated with the reference number 35, the equalizing space indicated with reference number 36 and the oil space indicated with reference number 31. All these spaces—apply piston space 35, balance piston space 36 and oil space 31—are supplied with oil via the oil supply channels 39.1, 39.2 and 39.3 formed in the connecting device 40. The function of the individual spaces 31, 35, 36 during actual operation will be discussed on the basis of FIG. 2*b*.

It is presumed that the clutch housing 21 is driven rotationally transmitting a torque. During operation of the apply piston 28 the steel core friction plates 25.1, 25.2, and 25.3 come into frictional contact with the respective corresponding friction plates 24, 27.1, 27.2 and 26, so that this torque is transmitted to the clutch hub 22. Based thereon, the oil in the corresponding spaces of the apply piston space 35, the balance piston space 36 and the oil space 31 is also brought into rotational movement. This rotational movement of the oil has the consequence that, on the basis of centrifugal force, it is thrown outward in radial direction r. This in turn has the consequence, that the pressure within these spaces 35, 36 and 31, along their radial borders, increases. The qualitative pressure distribution in the radial direction in the apply piston space is represented in FIG. 2*c*, the corresponding pressure distribution in the equalizing space is shown in FIG. 2*d*.

It will be easy for the person of ordinary skill to understand, that on the basis of the larger radial outer surface area of the apply piston space 35 larger pressure forces $p_K$ occur in the piston space than in the equalizing space ($p_A$). For this reason the pressure force $F_K$ of the apply piston 28 upon the apply plate 24 is steadily larger than the return-setting force $F_A$ on the basis of the pressure in the equalizing space 36. Known resetting spring systems, such as for example a here shown return spring device 33 in the equalizing space 36, in general although sufficient for achieving a complete compensation, have a high constructional cost and a corresponding adjustment is in this case urgently needed.

Figure 1A:
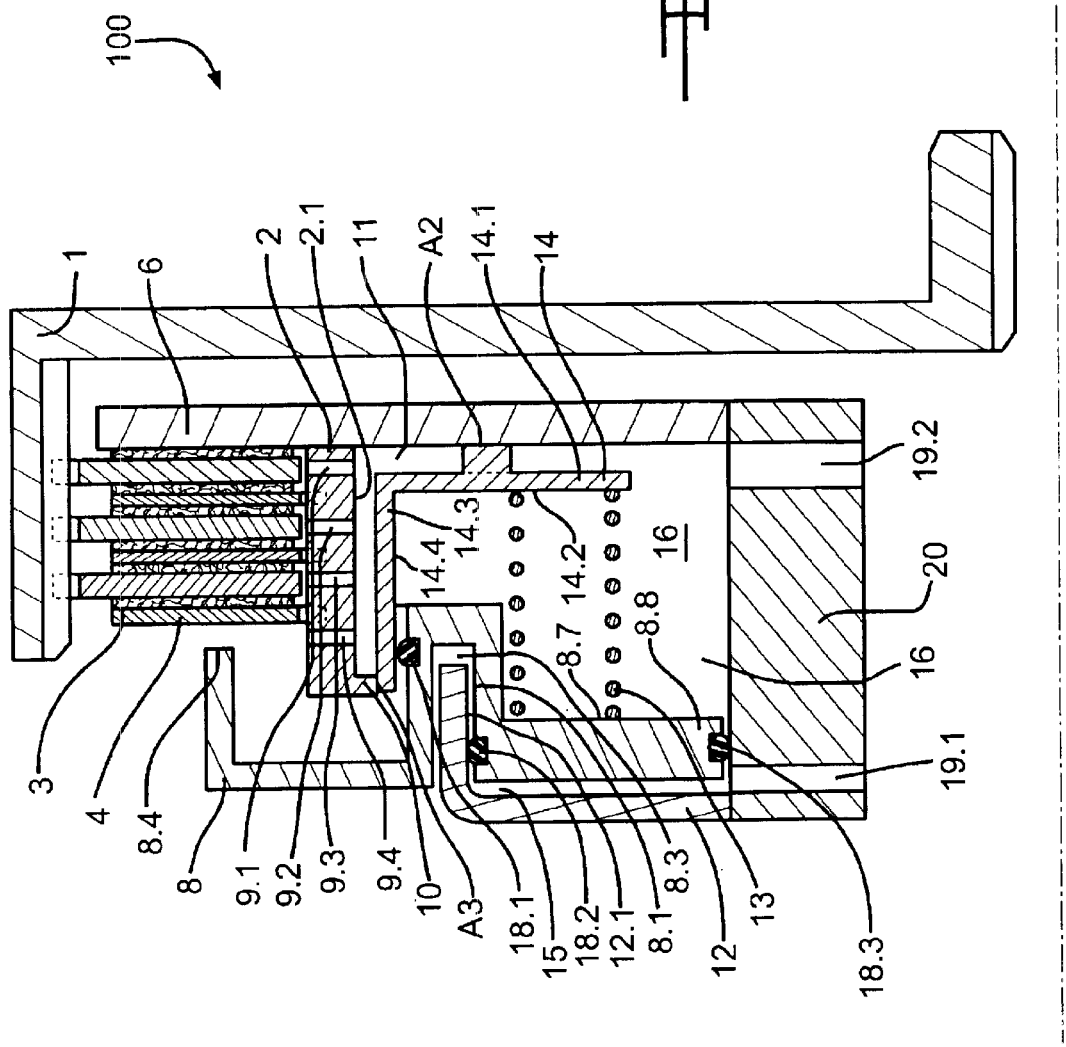
FIG. 1a an axial sectional representation of a wet clutch according to the invention, FIG. 1b an axial sectional representation of the wet clutch according to FIG. 1a with illustration of the hollow space in which oil is situated, namely apply piston space, equalizing space and oil space, FIG. 1c the spatial pressure distribution of the oil in piston space according to FIG. 1b, FIG. 1d the spatial pressure distribution of the oil in equalizing space according to FIG. 1b, FIG. 2a an axial sectional representation of a wet clutch according to the state of the art, FIG. 2b an axial sectional representation of the wet clutch according to FIG. 2a with illustration of the hollow space, in which oil is situated, namely actuating space, equalizing space (counter equalizing space) and cooling oil space, FIG. 2c the spatial pressure distribution of the oil in piston space according to FIG. 2b, and FIG. 2d the spatial pressure distribution of the oil in equalizing space according to FIG. 2b.
Figure 2B:
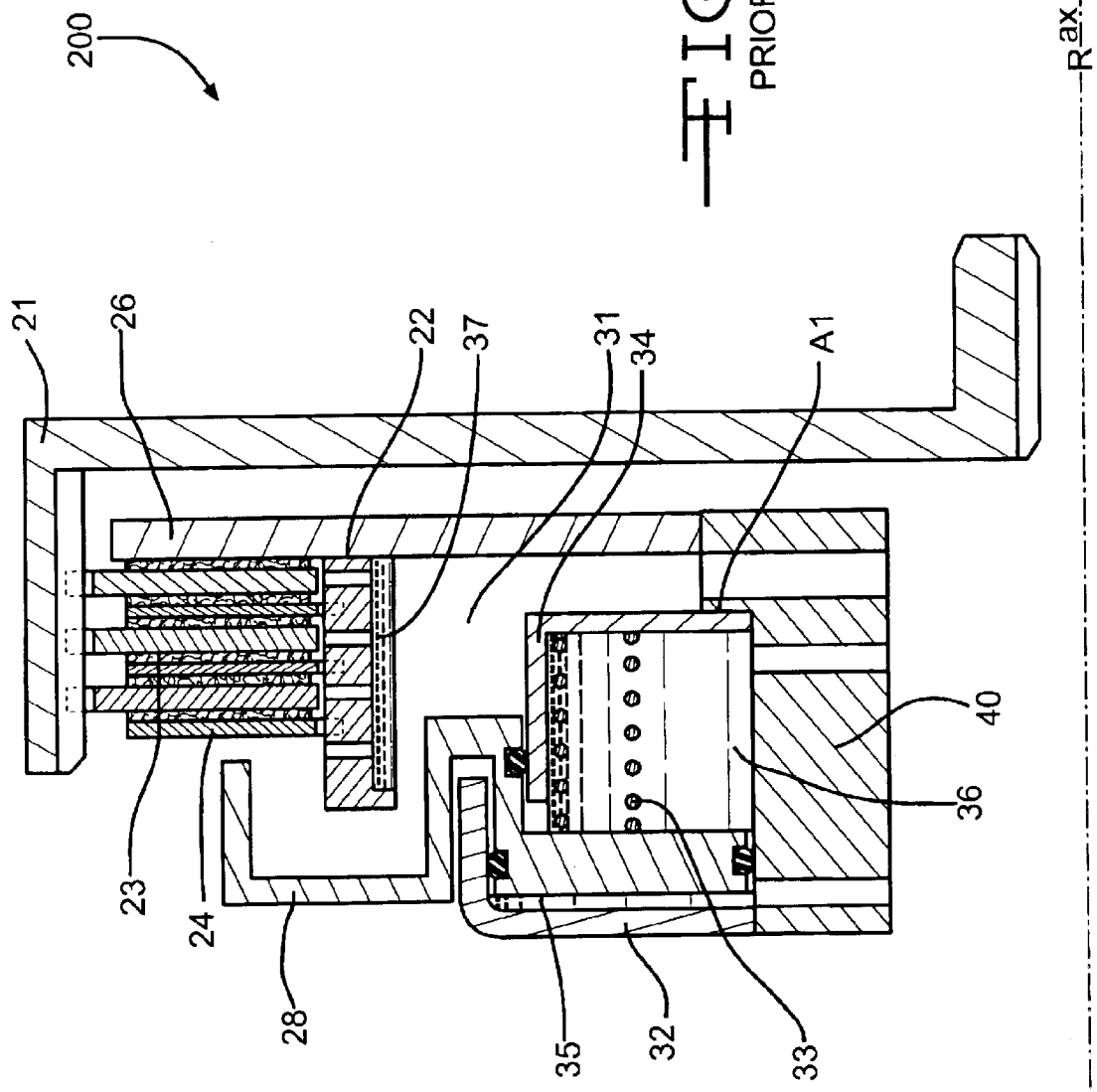
Figure 2C:
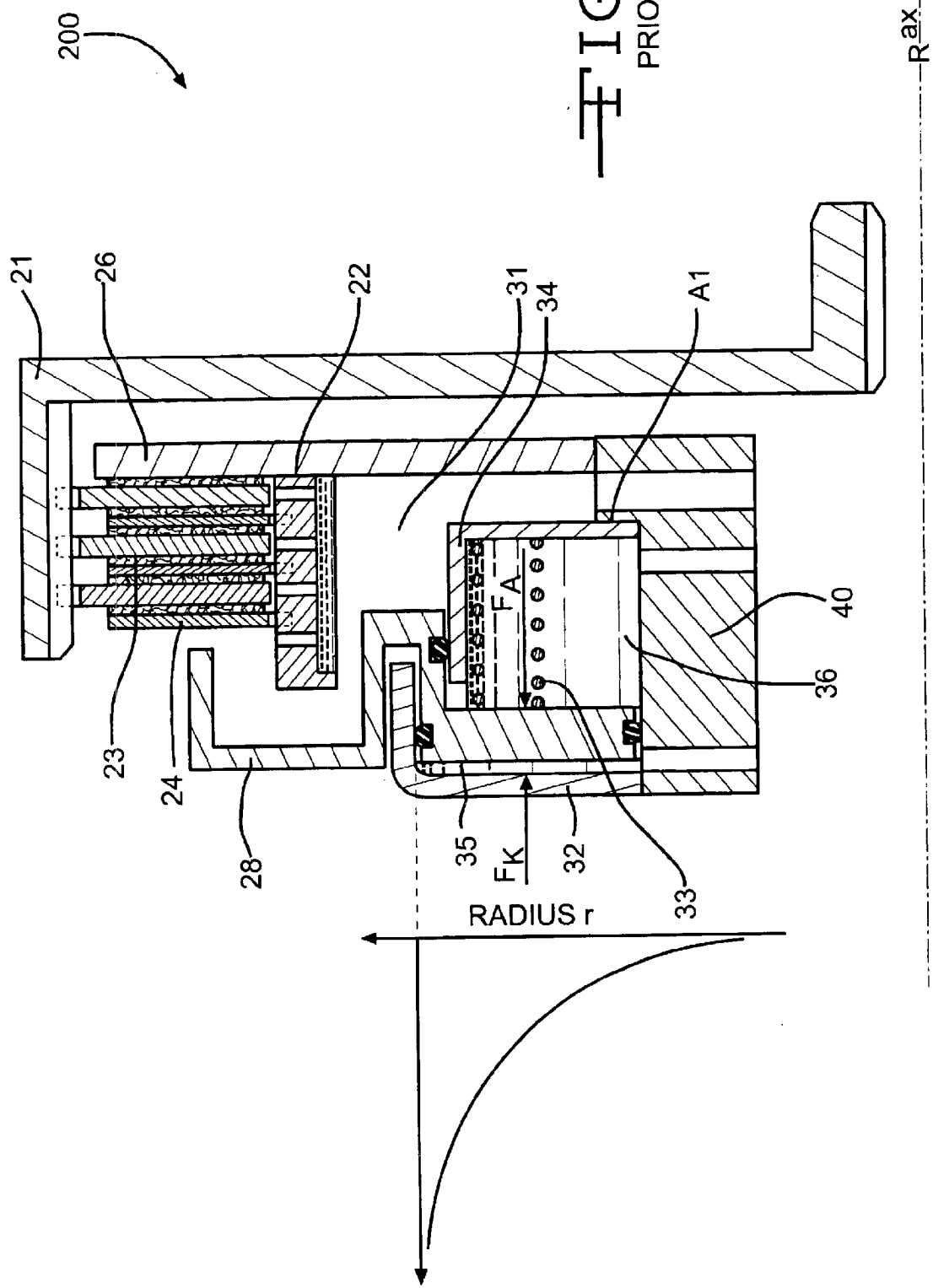
Figure 2D:
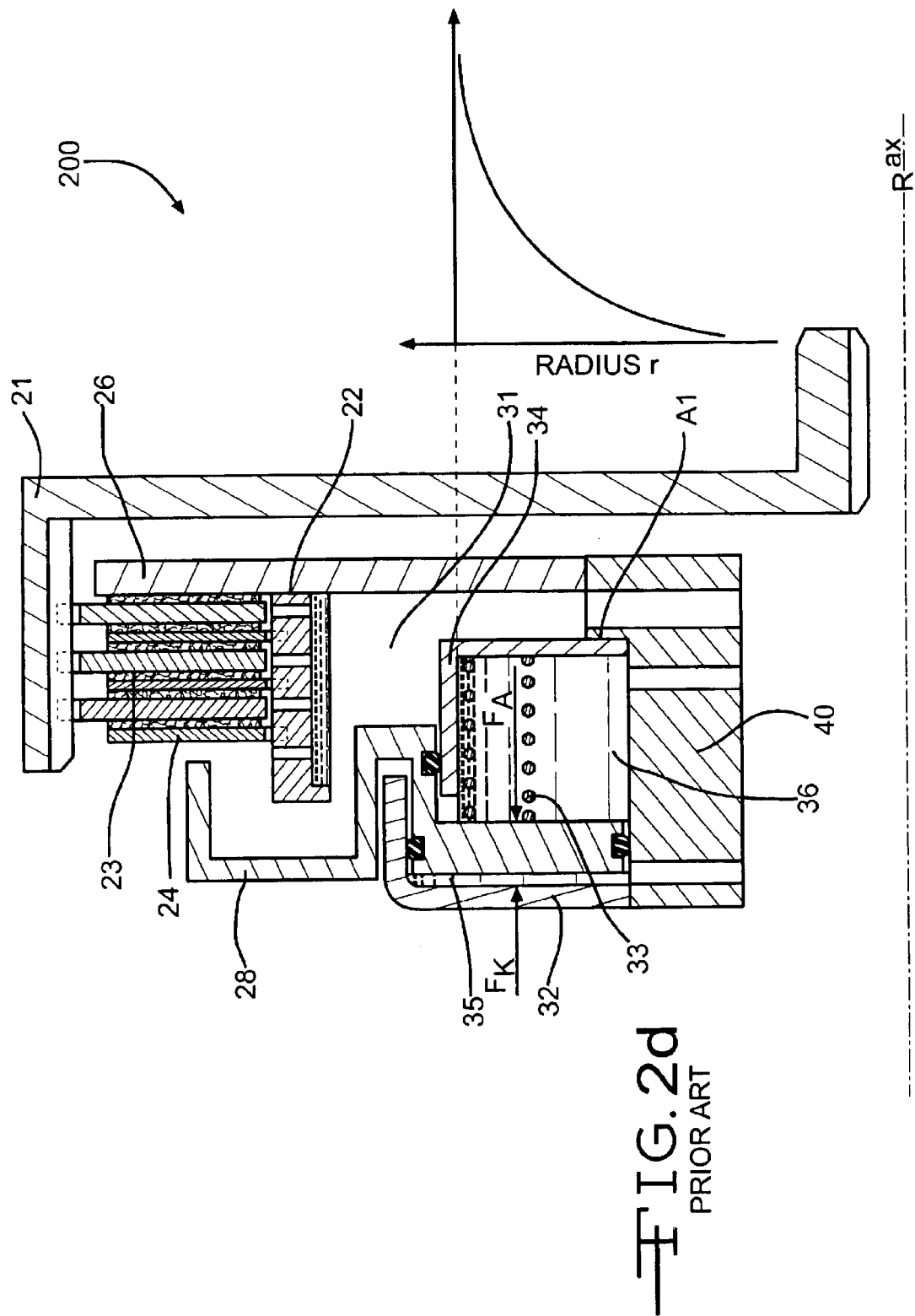

In accordance with the invention it is thus provided, that the balance piston is not provided in the manner shown in FIGS. 2*a* and 2*b*, but rather in the mode and manner shown in FIGS. 1*a* and 1*b*.

FIGS. 1*a* and 1*b* show a wet clutch 100 according to the invention. The wet clutch 100 according to the invention exhibits the below enumerated details in correspondence with the wet clutch 200 according to the state of the art, which is shown in FIG. 2*a* and 2*b*:

The basic elements of a wet clutch 100 of this type are, as described above in detailed, outer and clutch hubs 1, 2, the friction pack 3, the pressure and end plates referenced in this example with reference numbers 4 and 6, the apply piston support device 12, the apply piston 8 and the connecting device 20.

Further, there is also provided in the inventive wet clutch 100 a balance piston 14, which essentially exhibits the geometric shape of the balance piston 34 according to the state of the art. The balance piston 14 has an essentially ring shaped spring support 14.1 and a cylinder shaped wall 14.3 connected to the outer circumference of the spring support 14.1. The inner surface of the spring support 14.1 forms a spring supporting surface 14.2 against which in essentially the axial direction ax a spring device 13 is supported. The spring device 13 is supported on the other side against the apply piston 8 and its apply piston support inner surface 8.7 of its piston support plate 8.8.

In contrast to the illustrative embodiment according to the state of the art now the cylinder shaped wall 14.3 of the balance piston 14 is not provided radially within the cylinder shaped wall 12.1 of the apply piston support device 12, but rather in the axial direction between the clutch hub 2 and the cylinder shaped wall 12.1 of the apply piston support device 12.

While now the apply piston 8 in the inventive embodiment is guided in the apply piston support device 12 and the connecting device 20 now as described before is slideable in the axial direction ax by means of the guide elements 18.2 and 18.3 against the contact surfaces 8.1 of the circular shaped recess 8.3 and the contact surface 12.1 as well as the cylindrical shaped outer surface of the connecting device 20, now however the apply piston 8 guides the balance piston 14 now on the inner surface 14.4 of the cylinder shaped wall 14.3 thereof. As seal and guide aid there is again provided a guide element 18.1 of the above-described type.

As in the illustrative embodiment according to the state of the art, three spaces are enclosed by the apply piston support device 12, the apply piston 8 and the connecting device 20 or as the case may be the apply piston 8, the balance piston 14 and the connecting device 20 as well as the balance piston 14 and the clutch hub 2, which in the following will be referred to as apply piston space 15, equalizing space 16 and cooling oil space 11.

Figure 1C:
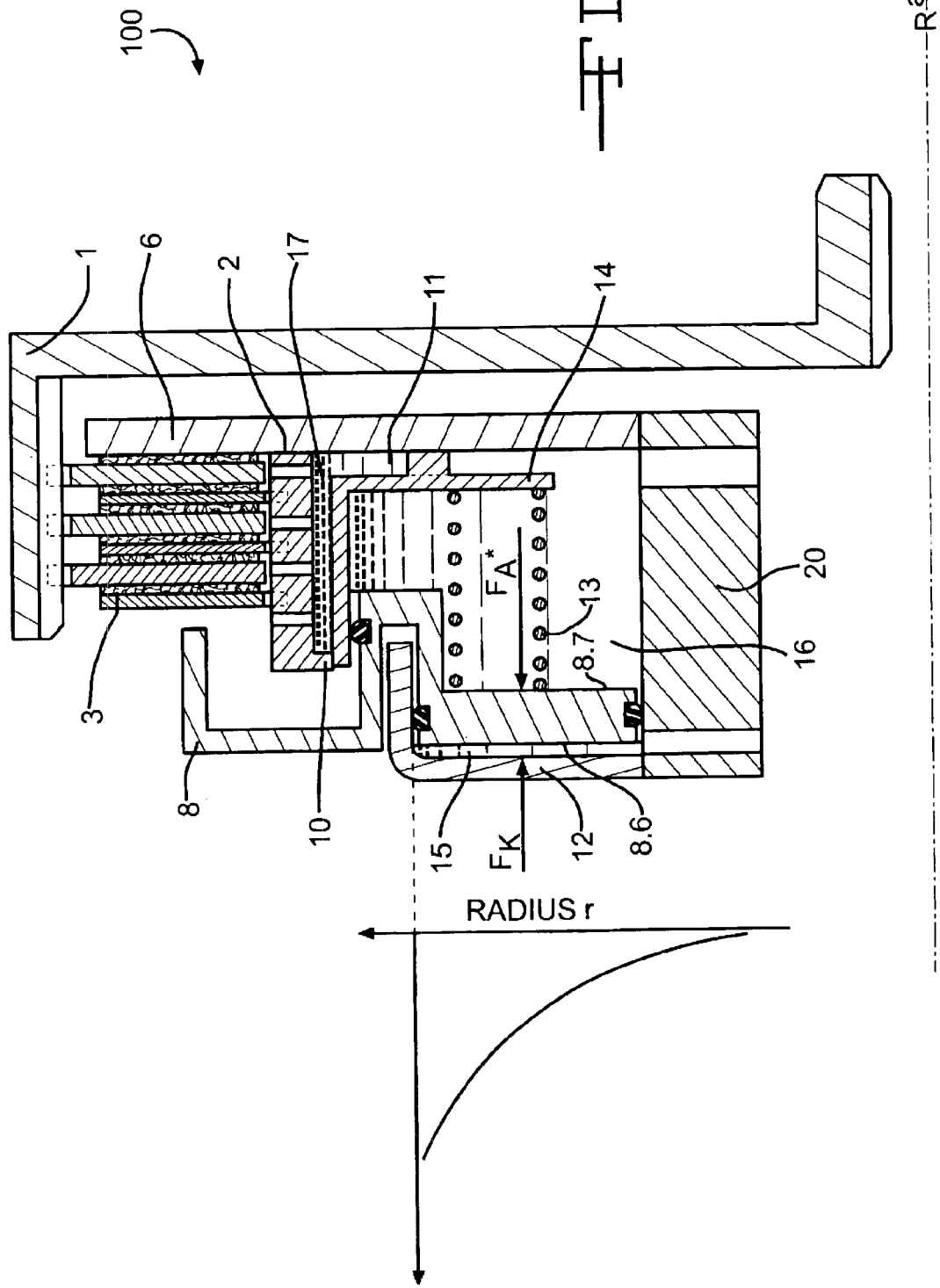
Figure 1D:
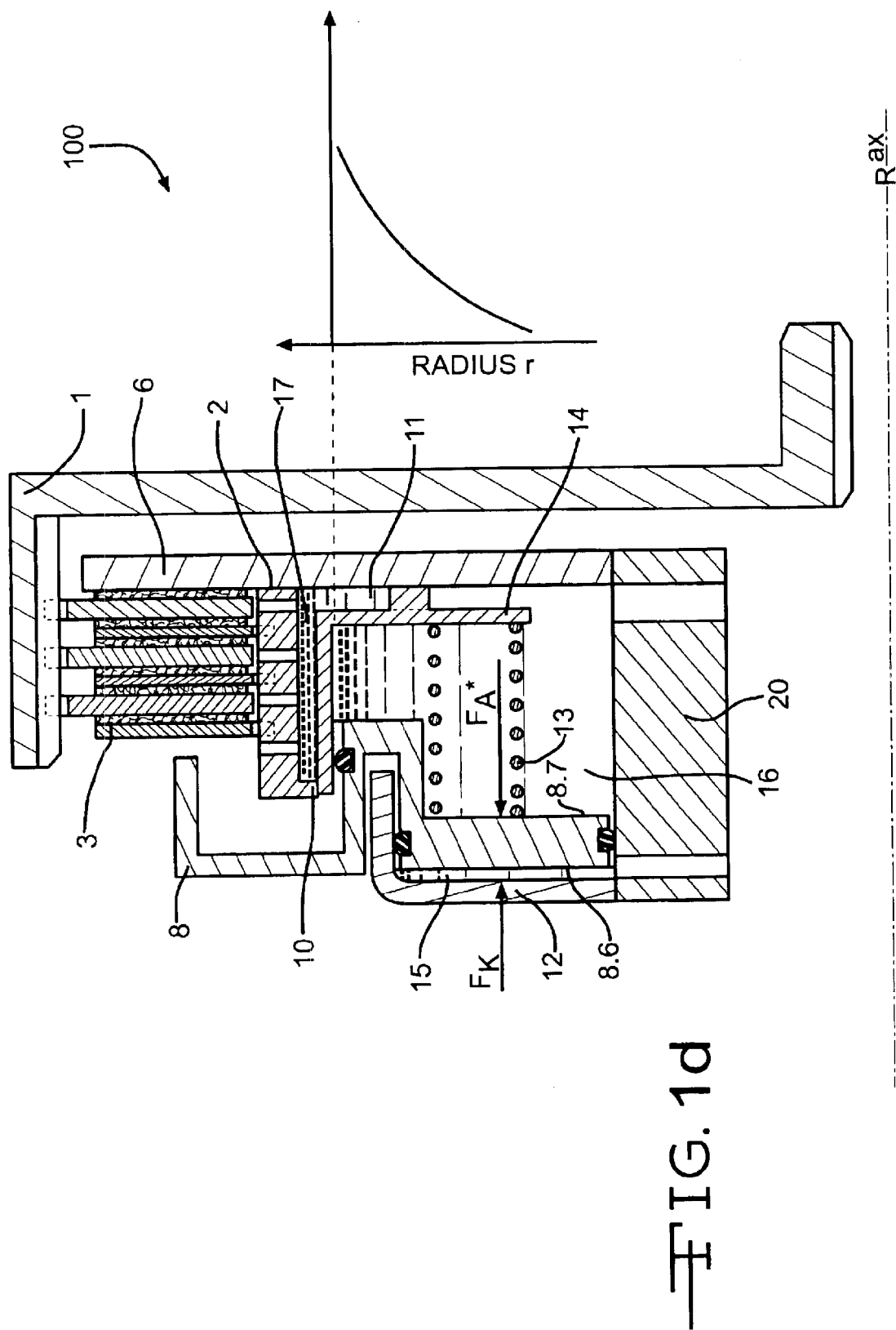

FIGS. 1c and 1d show, analogously to FIGS. 2c and 2d, the pressure relationship in the apply piston space 15 or, as the case may be, in the equalizing space 16 during actuation of the wet clutch 100.

As has already been discussed above, during rotating operation parabolic pressure profiles $p_k$, $p_A$ result in the radial direction r along the rotating surfaces 8.6, 8.7 of the apply piston 8 in the apply piston space 15 and in the equalizing space 16. FIG. 1c) shows the parabolic pressure profile $p_K$ (r) in the piston space 15. FIG. 1d shows the parabolic pressure profile $p_A$ (r) in the equalizing space 16.

The pressure profiles $p_k$ in the apply piston space 15 according to FIGS. 1c and 1d, on the basis of its design being identical with the apply piston space 35 according to FIGS. 2a and 2b, identical to the pressure profile $p_K$ in the apply piston space 35 of the wet clutch 200 according to the state of the art.

In comparison thereto, the equalizing space 16 in the wet clutch 100 according to the invention is further expanded in the radial direction r. The coil wetted surface 8.7 of the apply piston 8 in the equalizing space 16 is thus, in comparison to the wetted surface 8.6 of the apply piston 8 in the apply piston space 15, further extended or expanded in the radial direction. In this further expanded area the pressure $p_A^*$ in the equalizing space 16 will thus further rise. Thus in this case even higher compensation forces $F_A^*$ can occur than those pressure forces $F_K$, which result on the basis of the pressure increase $p_K$ in the apply piston space 15.

It has been found, that an arrangement of this type has further advantages. The engaging arrangement of clutch hub 2, balance piston 14 and apply piston 8 supported on the apply piston support device 12 implicates, as already described above, the formation of a so-called oil space 11. In this oil space there is situated likewise a certain amount of oil.

In an automatic transmission with wet clutch 100 it is necessary, for removal of the resulting frictional energy, to direct a part of this oil situated in the oil space 11 to the friction pack 3 in the form of an oil stream. Since the oil situated in the oil space 11 is thrown due to centrifugal force against the inner wall 2.1 of the clutch hub 2, this is usefully guided via appropriate oil supply channels 9.1, 9.2, 9.3, 9.4, which are situated in this inner wall 2.1 of the clutch hub 2, to the individual friction plates 3, 4, 6.

If the balance piston 14 is designed and provided in accordance with the invention then the volume of the oil space 11 is substantially smaller than the oil space 31 according to the state of the art, as can be seen from FIG. 2. From this particular arrangement of the balance piston 14 alone there occurs a supplemental forced guidance of the oil, which supplementally supports the oil transport to the friction plates 4, 6 of the friction pack 3.

From the state of the art it is known to provide for improvement of the oil transports to the friction plates, 24, 25.1, 25.2, 25.3, 26, 27.1, 27.2 of the friction pack 23, on the apply piston 28 facing side of the clutch hub 22 a radially inwardly directed oil collecting or retaining ring 30. An oil collecting ring of this type can be seen for example from the illustrative embodiment according to FIGS. 2a) and 2b) representing the state of the art. Via this oil retaining ring 30 there is produced an inner side 22.1 of the clutch hub 22 a fluid ring 37 of oil, which is supplied by oil flung out of the oil space 31. Thereby the oil is comparatively efficiently guided through the above-described oil channels 29.1, 29.2, 29.3, 29.4 or the like in the clutch hub 22 to the friction plates 24, 25.1, 25.2, 25.3, 26, 27.1, 27.2 of the friction pack 23. A higher oil volume is thereby detoured or bypassed to the clutch by overflowing the collecting ring 30.

Preferably, the apply piston 8 facing side of the clutch hub 2 includes a radially (r) inwardly facing oil collecting ring 10. At least one contact point, indicated in the figure with the reference symbol A3, to the balance piston 14 is provided at the inwardly facing oil collecting ring 10, forming an oil space 11 between the balance piston 14, clutch hub 2, and oil collecting ring 10. In this manner a forced flow is formed directly to the above-mentioned oil supply channels 9.1, 9.2, 9.3, 9.4 in the clutch hub 2. An evasion by a greater oil volume is no longer possible.

For increasing the stiffness and therewith for improving the hydro-mechanical reaction ability of the total system it is envisioned that the balance piston 14, as shown in the illustrative embodiment according to FIG. 1, includes at least one further contact point A2 to the clutch hub 2, which is provided on the spring support 14.1 of the balance piston 14.

For guaranteeing a sufficient oil transport the hollow cylindrically shaped connecting device 20 exhibits a common oil supply 19.2 for the equalizing space 11 and the oil space 16, while the apply piston is supplied via a separate oil supply 19.1.

It is however possible, that separate oil supplies are provided for the equalizing space 16 and the oil space 19.

REFERENCE NUMBER LIST

100 Wet clutch
1 Clutch housing
2 Clutch hub
2.1 Inner wall
3 Friction pack
4 Apply plate
6 End plate
8 Apply piston
8.1 Cylindrically shaped contact surface
8.2 Cylindrically shaped contact surface
8.3 Circular ring shaped recess
8.4 Cylindrically shaped contact surface
8.6 Piston support outer surface
8.7 Piston support inner surface
8.8 Piston support plate
9.1 Oil supply channel
9.2 Oil supply channel
9.3 Oil supply channel
9.4 Oil supply channel
10 Oil collecting ring
11 Oil space
12 Apply piston support device
12.1 Cylindrically shaped contact surface
12.7 Piston support inner surface
13 Spring device
14 Balance piston
14.1 Spring support
14.2 Spring support inner surface
14.3 Cylinder outer surface
14.4 Cylindrically shaped contact surface
15 Apply piston space
16 Equalizing space
17 Oil in oil space 11
18.1 Guide element
18.2 Guide element
18.3 Guide element
19.1 Oil supply opening
19.2 Oil supply opening 20 Connecting device
200 Wet clutch
21 Clutch housing
22 Clutch hub
23 Friction pack
24 Apply plate
24a Friction lining of the apply plate
25.1 Steel plate
25.2 Steel plate
25.3 Steel plate
26 End plate
26b Friction lining of the end plate
27.1 Friction plate
27.2 Friction plate
27.1a Friction lining
27.1b Friction lining
27.2a Friction lining
27.2b Friction lining
28 Apply piston
28.1 Cylinder shaped contact surface
28.2 Cylinder shaped contact surface
28.3 Ring shaped recess
28.4 Pressure device
28.6 Outer base surface
28.7 Inner base surface
28.8 Inner circumference surface
29.1 Oil supply channel
29.2 Oil supply channel
29.3 Oil supply channel
29.4 Oil supply channel
30 Oil collecting ring
31 Oil space
32 Apply piston support device
32.1 Wall
32.2 Piston support plate inner surface
32.3 Piston support plate
32.4 Contact surface
33 Spring device
34 Balance piston
34.1 Base plate
34.2 Wall
34.3 Outer surface
35 Apply piston space
36 Equalizing space
37 Oil ring
38.1 Guide element
38.2 Guide element
38.3 Guide element
39.1 Oil supply opening
39.2 Oil supply opening
39.3 Oil supply opening
40 Connecting device
40.1 Contact surface
ax Axial direction
r Radius
R Rotation axis
$p_K$ Pressure in the piston space
$p_A$ Pressure in the equalizing space
$p_A^*$ Pressure in equalizing space
$F_K$ Force on the basis of pressure in the piston space
$F_A$ Force on the basis of pressure in the equalizing space
$F_A^*$ Force on the basis of pressure in the equalizing space
A1 Contact point
A2 Contact point
A3 Contact point

I claim:

1. Wet clutch (100) or friction plate brake,
with a clutch housing (1) mounted rotatably about a rotation axis (R) and essentially having the shape of a hollow cylinder, carrying an essentially ring shaped outer friction plate or a plurality of essentially ring shaped outer friction plates and displaceable in essentially the axial direction,
with a clutch hub (2) mounted at least partially coaxially to the clutch housing (1), rotatable about the rotation axis (R), and essentially having the shape of a hollow cylinder, carrying one or more essentially ring shaped inner friction plates displaceable in essentially the axial direction,
wherein the outer friction plates and the inner friction plates are provided alternating in the axial direction (ax) to form a friction pack such that respectively one broad surface of an outer friction plate can be brought into frictional contact with a broad surface of an inner friction plate,
with an essentially hollow cylindrical shaped apply piston support device (12) provided coaxial to the clutch hub and lying radially inwardly, which is essentially rigidly connected with the clutch hub (2) by means of a connecting device (20),
with an apply piston (8) essentially in the shape of a hollow cylinder, mounted essentially axially displaceable on an essentially cylindrically shaped contact surface (12.1) of the apply piston support device (12), including an essentially ring shaped apply piston support plate (8.8), wherein the apply piston support device (12) and the piston support plate (8.8) enclose an apply piston space (15), and
including an essentially ring shaped pressure device (8.4), for bringing the respective contact surfaces of the friction plates of the friction pack into frictional contact, and an end plate (6) on the opposite side of said friction pack from said ring shaped pressure device (8.4), the improvement comprising a balance piston (14) having a cylindrical wall and a radial wall, said radial wall contacting said end plate (6) at a first contact means (A2) (6), said cylindrical wall contacting said clutch hub (2) at a second contact means (A3) said balance piston (14) said clutch hub (2) and said end plate (6) cooperating with said first and second contact means (A2 and A3) to define a cooling oil space (11) for receiving oil, one or more oil channels (9.1) providing communication between said cooling oil space (110 and said friction pack (3), said second contact means (A3) preventing the radially outward flow of oil except through said oil channels (9.1), said balance piston (14) cooperating with said apply piston (8), connecting device (20) and said end plate (6) to define an equalizing space (16).

2. Wet clutch (100) according to claim 1, thereby characterized, that the balance piston (14) includes at least one contact point (A2, A3), at which the balance piston (14) is connected with the clutch hub (2).

3. Wet clutch according to claim 1 further including essentially ring shaped spring support (14.1) and an essentially cylinder shaped wall (14.3) with an essentially cylinder shaped contact surface (14.4).

4. Wet clutch (100) according to claim 3, thereby characterized, that at least one contact point (A2) to the clutch hub (2) is provided on the spring support (14.1).

5. Wet clutch (100) according to claim 2 or 4, thereby characterized, that at least one contact point (A3) to the clutch hub (2) is provided at the outer surface of the cylinder (14.3) of the balance piston (14).

6. Wet clutch (100) according to claim 5, in which the apply piston (8) facing side of the clutch hub (2) includes a radially (r) inwardly facing oil collecting ring (10), thereby characterized, that at least one contact point (A3) to the balance piston (14) is provided at the inwardly facing oil collecting ring (10), forming an oil space (11) between the balance piston (14), clutch hub (2), and oil collecting ring (10), which provides forced cooling oil flow.

7. Wet clutch according to claim 5, in which the connecting device is formed in the manner of a hollow cylinder (20), thereby characterized, that the hollow cylinder (20) includes a common oil supply channel (19.2) for the equalizing space (16) and the oil space (11).

8. Wet clutch according to claim 5, in which the connecting device is formed in the manner of a hollow cylinder (20), thereby characterized, that the hollow cylinder (20) includes a separate oil supply channel for the equalizing space (16) and the oil space (11).

* * * * *